April 6, 1965   C. C. SULLIVAN   3,176,984
CAPTIVE JET PROPELLED ROUNDABOUT TOY AIRCRAFT
Filed Oct. 30, 1961   2 Sheets-Sheet 1
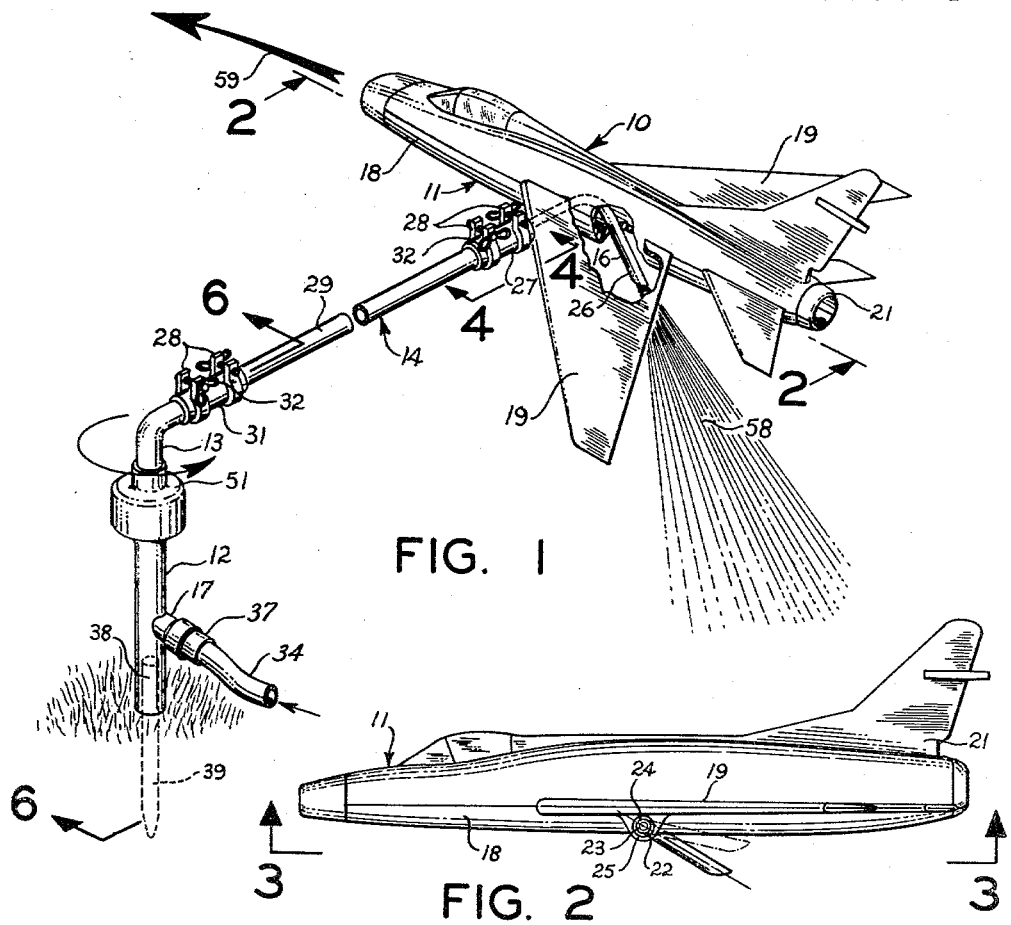
FIG. 1
FIG. 2
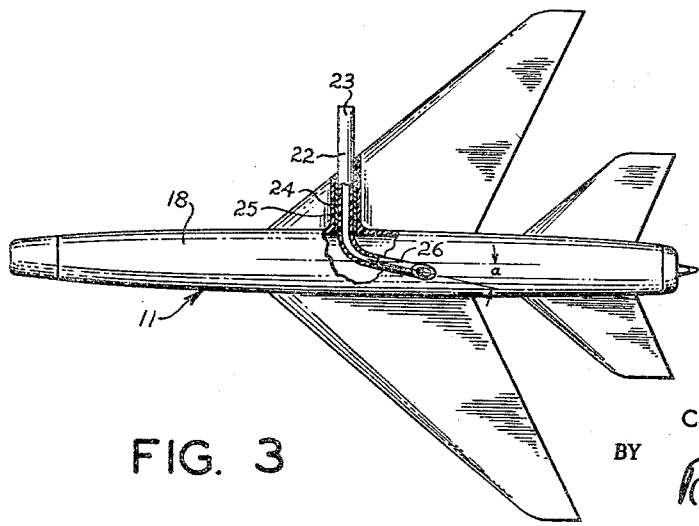
FIG. 3
INVENTOR.
CLINTON C. SULLIVAN
BY
*R. E. Beaugureau*
ATTORNEY April 6, 1965 C. C. SULLIVAN 3,176,984
CAPTIVE JET PROPELLED ROUNDABOUT TOY AIRCRAFT
Filed Oct. 30, 1961 2 Sheets-Sheet 2
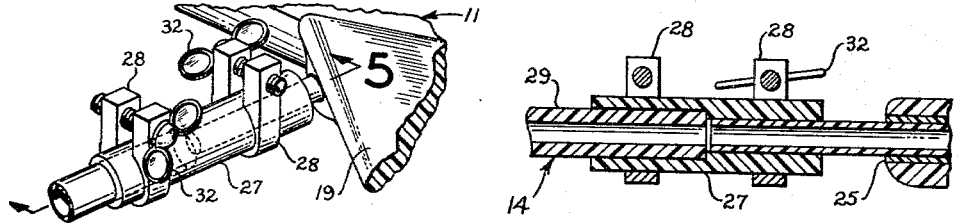
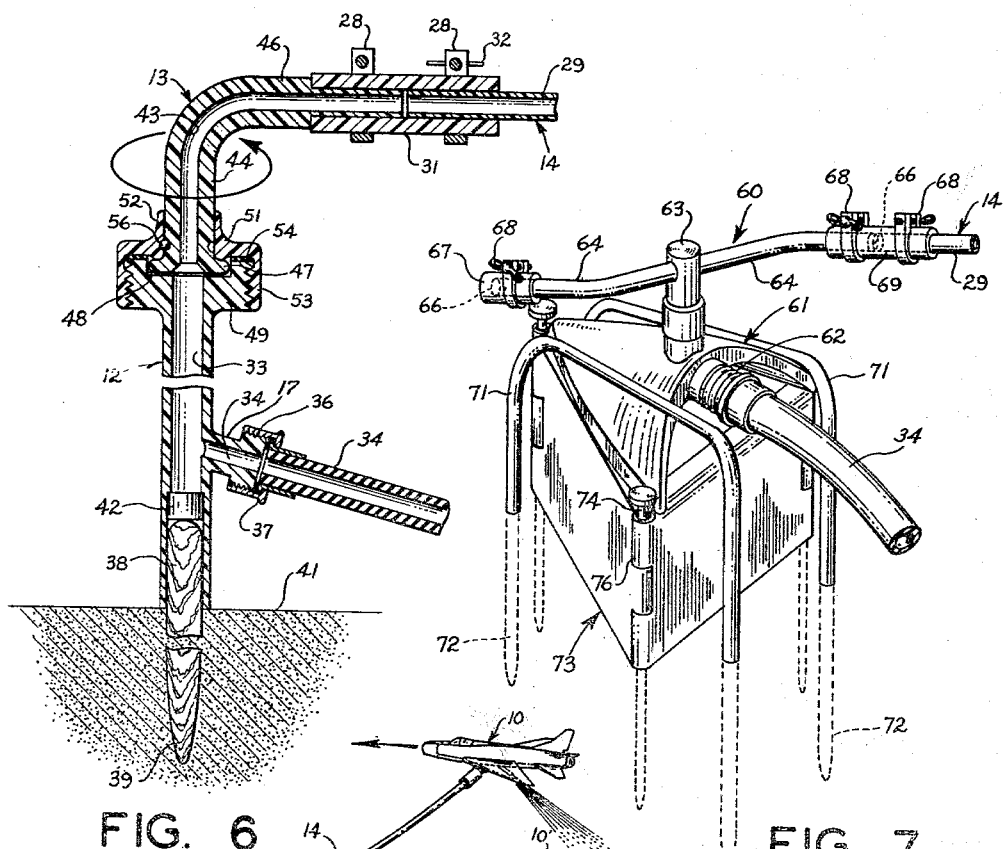
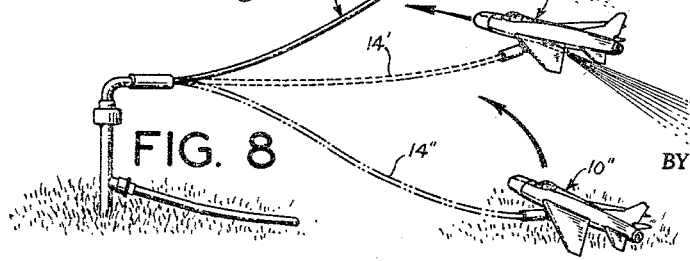
INVENTOR.
CLINTON C. SULLIVAN
BY
R. E. Geauque
ATTORNEY

United States Patent Office 3,176,984
Patented Apr. 6, 1965

3,176,984
CAPTIVE JET PROPELLED ROUNDABOUT
TOY AIRCRAFT
Clinton C. Sullivan, 1413 Lindsay Drive,
Bakersfield, Calif.
Filed Oct. 30, 1961, Ser. No. 148,632
3 Claims. (Cl. 272—31)

This invention relates to a captive jet propelled toy aircraft and more particularly to a toy aircraft capable of sustained flight which is held captive to a source of fluid under pressure, such as water, for sustaining flight of the aircraft in a predetermined pattern.

This invention provides a new and improved captive toy aircraft which is capable of sustained flight, means for tethering the aircraft to revolve around a pedestal adapted to receive fluid under pressure whereby the fluid under pressure is transmitted to a jet nozzle of the aircraft for propelling the aircraft in a predetermined circular pattern around the pedestal. The tethering means comprises an elongated tubular member detachably secured at its ends to the pedestal and the jet nozzle, respectively. The tubular member is relatively flexible and non-rotatably secured transmits fluid under pressure from the pedestal to the jet nozzle and is substantially pliant so as to enable an upward flight of the aircraft in response to an upward thrust force applied by the jet nozzle. The tubular member is resilient so as to substantially resist the upward thrust force and apply a downward force whereby the aircraft flies with an undulating action while flying in circular pattern.

It is therefore an object of this invention to provide a new and improved captive toy aircraft for the amusement of children which can be easily and readily operated by thrust force applied by fluid under pressure.

Another object of this invention is to provide a new and improved toy aircraft which may be operated by ordinary water pressure supplied in the plumbing of a residence, or the like.

A further object of this invention is to provide a new and improved captive toy aircraft which includes an improved tethering means for permiting the aircraft to fly in a predetermined circular pattern with realistic undulating action.

An incidental object of this invention is to provide a new and improved captive toy aircraft in which the propellant fluid discharged by the jet nozzle is useful for spraying or watering a garden or lawn while propelling the aircraft.

Yet another object of this invention is to provide a new and improved captive toy aircraft which is economical to manufacture and is capable of mass production.

A general object of this invention is to provide a new and improved captive toy aircraft of the character described which overcomes disadvantages of prior means and methods heretofore intended to accomplish generally similar purposes.

These and other objects of this invention will be more apparent from the following detailed description, drawings and appended claims.

In the drawings:

FIGURE 1 is a perspective view, in elevation, of the captive toy aircraft of this invention, with parts thereof foreshortened for greater clarity;

FIGURE 2 is a side view, in elevation, of the toy aircraft of FIGURE 1, as viewed substantially along the line 2—2 of FIGURE 1;

FIGURE 3 is a bottom view thereof, as viewed substantially along the line 3—3 of FIGURE 2, with parts broken away for greater clarity;

FIGURE 4 is an enlarged, fragmentary, perspective view, in elevation, illustrating a connector means of FIGURE 1 in greater detail;

FIGURE 5 is a vertical, cross-sectional view as taken substantially along the line 5—5 of FIGURE 4;

FIGURE 6 is an enlarged, vertical, cross-sectional view as taken substantially along the line 6—6 of FIGURE 1;

FIGURE 7 is a perspective view, in elevation, of a modified embodiment of this invention; and FIGURE 8 is a diagrammatic view illustrating the action of the invention in greater detail.

Referring in detail to the drawings, and more particularly to FIGURES 1–6, inclusive, there is shown by way of illustration, but not of limitation, a first embodiment of a captive toy aircraft designed and constructed in accordance with this invention and generally designated by the numeral 10. The aircraft 10 is herein illustrated as a jet plane 11 capable of sustained flight in a predetermined circular pattern around a pedestal 12 which is adapted to receive a fluid under pressure. The jet airplane 11 is tethered or held captive to the pedestal 12, or more particularly to a swivel fitting 13 rotatably secured to the pedestal 12, by a tethering means, generally designated by the numeral 14, connecting the fitting 13 to a jet nozzle 16 embodied in the airplane 11.

The pedestal 12, fitting 13 and tethering means 14 are hollow, forming a continuous passage communicating between a fluid pressure inlet 17 and the jet nozzle 16 to apply a lifting and forward thrust to the aircraft 11 so that the aircraft is elevated and propelled in a substantially circular pattern around the axis of the pedestal 12.

The aircraft 11 may be conveniently formed, by casting or molding, in any desired configuration of body 18 and is provided with outwardly extending wings 19 and tail assembly 21 to make the aircraft capable of sustained flight in response to application of a thrust force thereagainst.

The nozzle means 16, as best seen in FIGURES 1–3, inclusive, includes a tubular member 22 mounted on a substantially central portion of the body 18 and having an inlet 23 extending transversely from the body 18, the tubular member 22 being conveniently supported on the airplane 11 in a tubular bushing 24 formed in one of the wings 19. The tubular member 22 further includes an outlet 26 which extends rearwardly and angularly downwardly relative to longitudinal centerline of the body 18, preferably at an angle of approximately 45° to the centerline of the body. The inlet 23 is connected to the tethering means 14 by a tubular connector 27 which is detachably secured to the inlet 23 and the tethering means 14 by a tubular connector 27 which is detachably secured to the inlet 23 and the tethering means 14 by removable clamp members 28. The tethering means 14 comprises an elongated tubular member 29 whose opposite end is secured to the fitting 13 by a similar coupling member 31 detachably secured to the fitting 13 and tubular member 29 by similar clamping members 28.

The clamping members 28 may be conveniently clamped on the coupling members 27 and 31 by screws having wing nuts 32.

The swivel fitting 13 is rotatably secured to the upper end of the pedestal 12 which is hollow in construction. The pedestal has a passageway 33 extending therethrough to communicate with the transverse fluid inlet 17 which is exteriorly threaded at 36 for coupling to a female fitting 37 of the garden hose 34 for receiving fluid under pressure therefrom. A spike member 38 is preferably embodied in the passageway 33 and includes a point 39 which may be driven into a support member such as the ground 41 of a lawn, or the like, for supporting the pedestal 12 in a relatively vertical position relative to the support 41. A sealing member 42 is preferably provided in the passageway 33 to avoid leakage past the spike member 38.

The swivel fitting 13 includes a through passageway 43 communicating with the passageway 33 of the pedestal 12 so that the fluid under pressure received from the garden hose 34 is passed therethrough to the tubular member 29. The fitting 13 is in the form of an elbow, having a vertical leg 44 aligned with the pedestal 12 and a transverse leg 46 extending at substantially a right angle to the leg 44, the leg 46 being connected by the coupling member 31 to the tubular member 29 of the tethering means. The leg 44, as best seen in FIGURE 6, includes an enlarged outer end 47 rotatably residing in a counterbore 48 of an enlarged head 49 of the pedestal 12 so as to align the passageway 43 with the passageway 33. A coupling member 51 includes a sleeve portion 52 which is integral with an enlarged internally threaded skirt portion 53 threadedly engaging external annular threads of the head 49. An annular sealing member 54 seals the threaded connection of the skirt to the head 49. In this manner, the fitting 13 is rotatable relative to the pedestal 12 while transmitting fluid therethrough from the pedestal 12 yet having sealing means preventing leakage at the swivel fitting during rotation thereof. A second resilient seal 56 is preferably provided between the tubular portion 52 and the fitting leg 44 to prevent leakage of fluid thereat.

It is preferable, for purposes of economy and for facilitating manufacture of the component parts of the embodiment 10, that the parts be cast, molded or otherwise formed from a plastic material with the exception that the spike 38 which is preferably formed of a relatively-rigid material such as wood, metal, or the like. The pedestal 12, the fitting 13 and the jet nozzle 16 are preferably made of a relatively rigid material such as plastics, or the like, whereas the couplings 27 and 31 and the tubular member 29 are preferably formed of a relatively flexible material such as semi-pliant plastics. In this manner, the tethering means 14 forms a flexible connection which is prevented from rotation by the clamps 28 but which is capable of bending upwardly and downwardly in response to thrust by the nozzle 16 to propel the craft 11 in an undulating pattern while it is being propelled in its circular pattern around the vertical axis of the pedestal 12.

In the operation of the device, as will now be more clearly understood from the foregoing description, the aircraft 11, before fluid pressure is admitted into the pedestal 12 through the garden hose 34, normally rests, due to gravity, on the ground support 41. When the pressure is turned on by a valve normally associated with a supply of fluid under pressure to the garden hose 34, the fluid is admitted into the passage 33 of the pedestal, into passageway 43 of the swivel fitting 13, through the tubular member 29 of the tethering means 14 and into the jet nozzle 16 from which it exits as a jet spray indicated by the numeral 58 to apply an axial thrust on the airplane 11 to propel the airplane in a direction indicated by the arrowed line 59 in FIGURE 1. The outlet 26 of the jet nozzle means 16, being downwardly and angularly directed in a rearward direction, as previously described, also applies a thrust force to lift the jet plane 11 upwardly relative to the axis of the pedestal 12 while also applying a forward or axial thrust thereagainst. The upward vector of the thrust force tends to straighten the tubular member 29 and couplings 27, 31 to the position shown in FIGURE 1, under average fluid pressure, whereas the forward vector of the thrust forces tends to lift the plane upwardly. The resultant force of the thrust vectors provide a thrust force directing the plane upwardly and axially so as to revolve around the vertical axis of the pedestal 12.

The speed of the jet airplane 11 and its lift and fall may be predetermined by controlling the pressure admitted through the garden hose into pedestal 12. The valve (not shown) may be controlled to decrease or increase the fluid pressure to allow greater or lesser lift on the plane while providing a greater or lesser axial thrust on the plane to rotate around the axis of tht pedestal 12, as desired. The tubular member 29 and couplings 27 and 31, being of semi-pliant plastic material, are resilient to resist the lifting force of the thrust vectors to thereby assist gravity in lowering the airplane in response to lowering of the fluid pressure. Furthermore, even under a constant fluid pressure, the resistance of the tubular member 29 and the couplings 27 and 31 to the lifting forces tends to cause the airplane 11 to undulate upwardly and downwardly while being propelled in its circular pattern.

Referring more particularly to FIGURE 7, another embodiment of this invention having a modified form of pedestal and swivel means is shown. In the instant embodiment, the pedestal, generally designated by the numeral 61, is shown as the base of a water sprinkler having an inlet 62 adapted to be connected as to the garden hose 34 and a rotatably mounted hollow shaft 63 having a sprinkler arm 64 commonly used for watering a lawn. The instant construction of the swivel 63 and base 61 are not part of the invention, per se, except as modified for use to be connected to the tethering means 14 previously described in the first embodiment for propelling an aircraft capable of sustained flight in similar manner. In the instant embodiment, the shaft 63 is rotatable in response to admission of fluid pressure to the inlet 62 to rotate the sprinkling arms 64 which have opposed outlets 66 for spraying water while rotating with the shaft 63.

In accordance with this invention, the modification 60 teaches the use of the arms 64 for transmitting the fluid pressure to the tethering means 14 so as to communicate the fluid pressure of the garden hose 34 to a jet nozzle similar to the jet nozzle 16 previously described.

For this purpose, one outlet 66 is provided with a closure member 67 for closing the opening, the closure member being secured to the arm as by a clamp 68 similar to the clamps 28. A coupling 69, similar to the couplings 27 and 31, is used to couple the tubular member 29 of the tethering means 14 to the opposed arm 64 whereby fluid pressure from the inlet 62 is transmitted through the hollow shaft 63, through the opposed arm 64 and to the tubular member 29. The coupling member 69 is preferably non-rotatably secured to the arm 64 as by clamps like 68. The coupling member 69 is preferably semi-pliant and relatively flexible, similar to the couplings 27 and 31 so that an aircraft, similar to the aircraft 11, may undulate during its sustained flight when a pressure is applied to the inlet 62.

The base 61 may be secured on the ground support 41 by U-shaped holding members 71 spanning the base 61 and having sharpened points 72 driven into the ground. If desired, the base 61 may be elevated from the ground support 41 by foldable members indicated generally by the numeral 73 and having hinge pins 74 extending through rolled edges 76 of the panel members 73 for securing the base to the panels 73.

The jet nozzle 16 is also preferably set at an angle (a) relative to a vertical plane passing through the longitudinal centerline of the airplane 11 so as to create a slight transverse thrust to the airplane. Furthermore, the jet nozzle is preferably angularly adjustable relative to the horizontal plane passing through the centerline of the airplane so as to adjust the upward thrust of the nozzle exit. For this purpose, means are provided for adjusting the angular thrust of the nozzle. In a preferred form, the bushing 24 preferably includes a sleeve 25 of high friction material such as rubber, or the like, and the transverse portion 22 of the nozzle is rotatable to adjust the angle of the outlet portion 26 from the position shown in solid lines to the position shown in broken lines in FIGURE 2. The sleeve 25 forms a holding means for holding the portion 22 in a predetermined position relative to the bushing 24. Other means, such as an adjustable wedge (not shown) or the like, may be optionally provided for adjusting the angular thrust of the nozzle, if desired.

The flight of the airplane 11 may be controlled by adjustment of the jet nozzle 16. When the angle between the part 26 is decreased so as to position the portion 26 in its broken line position of FIGURES 2 and 8, the axial thrust is greater than the lift thrust and the airplane flies lower but faster at a given pressure applied thereto. In its solid line position, of FIGURES 2 and 8, it will be readily observed that the lift thrust is increased so as to fly the airplane at a higher altitude with a greater bend of the tethering tube 14, but at a slower speed, since the axial thrust is decreased.

The phantom line 14″ of FIGURE 8 illustrates the normal position of the airplane when the pressure is turned off.

While there is herein shown and described what is conceived to be the most practical and preferred embodiments of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

1. In a captive toy aircraft capable of sustained flight, the combination with: hollow pedestal means adapted to received fluid under pressure said pedestal means having a rotatable outlet; jet nozzle means mounted on said aircraft intermediate its ends and having an outlet directed rearwardly and downwardly relative to the longitudinal centerline of said aircraft to continually produce upward and forward thrust; and flexible, tubular tethering means rigidly connected at one end to said rotatable outlet and rigidly connected at the other end to said jet nozzle means for communicating fluid under pressure from said pedestal means to said jet nozzle means so as to propel said toy aircraft circularly about said pedestal means and elevate said aircraft against the resistance of said tethering means, said tethering means being constructed of a material to resist upward movement of said aircraft and to resist rotation of said aircraft about the major axis of said tethering means.

2. A toy comprising: an aircraft capable of sustaining flight and having a body and a pair of opposed wing members; jet nozzle means mounted in said body and having an inlet extending transversely from a substantially central portion of said aircraft and an outlet directed rearwardly and angularly downwardly relative to the longitudinal centerline of said body to continually produce upward and forward thrust; hollow pedestal means adapted to receive fluid under pressure and to be vertically supported on a support; fitting means rotatably mounted on said pedestal means, said fitting means including an outlet extending radially therefrom and an inlet communicating with said hollow pedestal for receiving fluid under pressure; and tethering means comprising an elongated tubular member having ends, one of said ends being rigidly connected to said radial outlet of said fitting means and the other of said ends being connected to said inlet of said jet nozzle means for communicating fluid under pressure from said fitting to said jet nozzle means, said aircraft being responsive to the thrust forces of fluid existing through said jet nozzle means for describing a circular pattern around said pedestal means said tethering means being constructed of a material to resist upward movement of said aircraft and resist rotation of said aircraft about the major axis of said tubular member.

3. A toy as defined in claim 2, wherein said jet nozzle means is adjustable relative to said aircraft so as to adjust the lift and axial thrust forces of said jet nozzle means when said fluid pressure is applied thereto.

References Cited by the Examiner
UNITED STATES PATENTS

| 2,484,468 | 10/49 | Schaad | 46—76 X |
| 2,921,743 | 1/60 | Westover et al. | 46—77 X |
| 3,080,676 | 3/63 | Stanzel | 46—77 |
| 3,093,927 | 6/63 | Smith | 46—77 |

FOREIGN PATENTS

| 1,077,147 | 4/54 | France. |
| 79,754 | 11/55 | Netherlands. |

RICHARD C. PINKHAM, *Primary Examiner.*
EVON C. BLUNK, *Examiner.*